US010399016B2

(12) United States Patent
Angelino (10) Patent No.: US 10,399,016 B2
(45) Date of Patent: *Sep. 3, 2019

(54) SKIMMER BASKET FOR SWIMMING POOLS

(71) Applicant: Paul Angelino, Orlando, FL (US)

(72) Inventor: Paul Angelino, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/881,290

(22) Filed: Jan. 26, 2018

(65) Prior Publication Data

US 2018/0147507 A1 May 31, 2018

Related U.S. Application Data (63) Continuation-in-part of application No. 14/822,260, filed on Aug. 10, 2015, now Pat. No. 9,896,855.

(51) Int. Cl.
| | | |
|---|---|---|
| *B01D 29/96* | (2006.01) | |
| *E04H 4/12* | (2006.01) | |
| *B01D 29/11* | (2006.01) | |
| *B01D 29/35* | (2006.01) | |
| *B01D 29/94* | (2006.01) | |

(52) U.S. Cl.
CPC .............. *B01D 29/96* (2013.01); *B01D 29/11* (2013.01); *B01D 29/35* (2013.01); *B01D 29/94* (2013.01); *E04H 4/1272* (2013.01); *B01D 2201/40* (2013.01)

(58) Field of Classification Search
CPC ........ B01D 29/96; B01D 29/35; B01D 29/94; B01D 29/11; B01D 2201/40; E04H 4/1272

USPC ......... 210/167.1, 167.19, 232, 237, 238, 44, 210/448
See application file for complete search history.

(56) References Cited

U.S. PATENT DOCUMENTS

| | | | | | |
|---|---|---|---|---|---|
| 3,469,700 | A | * | 9/1969 | Johnson | E04H 4/1236 210/167.16 |
| 3,513,977 | A | * | 5/1970 | Bellinson | B01D 29/117 210/94 |
| 3,542,201 | A | * | 11/1970 | Belonger | B01D 35/28 210/167.1 |
| 4,460,462 | A | * | 7/1984 | Arneson | E04H 4/1236 210/163 |
| 6,071,403 | A | * | 6/2000 | Usher | B01D 29/117 210/167.12 |
| 6,187,181 | B1 | * | 2/2001 | Stoltz | E04H 4/1263 15/1.7 |
| 8,168,065 | B1 | * | 5/2012 | Gavigan | C02F 1/76 210/167.11 |

(Continued)

*Primary Examiner* — Fred Prince
(74) *Attorney, Agent, or Firm* — BakerHostetler (57) ABSTRACT

The present disclosure provides a skimmer basket assembly. The skimmer basket assembly may include a basket, the bottom of which may include one or more flaps. A handle may be connected to the basket via one or more connectors configured to selectively expand and contract. The handle may include a trigger mechanism that is mechanically linked to the one or more flaps of the basket. The trigger mechanism may be configured to operate the one of more flaps of the basket upon manipulation of the trigger mechanism. The skimmer basket assembly may include a lid that is slidingly connected to the one or more connectors. The lid may be configured to receive the handle therein and substantially cover a top opening of the basket.

20 Claims, 11 Drawing Sheets

(56) References Cited

U.S. PATENT DOCUMENTS

| | | | | |
|---|---|---|---|---|
| 2008/0078711 A1* | 4/2008 | Ensor | .................... | E04H 4/1218 210/167.1 |
| 2009/0050545 A1* | 2/2009 | Goffman | ............... | E04H 4/1218 210/95 |
| 2015/0136678 A1* | 5/2015 | Lopez | ................... | E04H 4/1209 210/237 |
| 2015/0354241 A1* | 12/2015 | Pettit | ..................... | B01D 29/35 210/791 |

* cited by examiner

SKIMMER BASKET FOR SWIMMING POOLS

CROSS-REFERENCE TO RELATED APPLICATIONS

This application claims priority to U.S. patent application Ser. No. 14/822,260, filed Aug. 10, 2015 and entitled "Skimmer Basket for Swimming Pools", which is incorporated by reference herein in its entirety.

TECHNICAL FIELD

The technical field relates generally to swimming pool maintenance and more particularly to a skimmer basket for use with a swimming pool.

BACKGROUND

The water in a swimming pool may be host to a number of contaminants, ranging from microscopic contaminants, such as bacteria, viruses, protozoa, or fungi, to larger contaminants, such as leaves, sticks, hair clumps, or even animals. In order to eliminate these contaminants, a pool may contain a filtration system, wherein water is drawn off from the top of the water level via a water pump and passed through one or more filters before being recirculated back into the pool. In order to trap the larger contaminants before the water is passed through the water pump and small-particle filters, a skimmer basket may be positioned within a skimmer basket well, which is in fluid communication with the water pump. The skimmer basket may typically be accessed via an opening at the top of the skimmer basket well and removed for cleaning. The removal and cleaning of the skimmer basket may prove to be an unpleasant task due to the occasional presence of an objectionable item trapped by the skimmer basket, such as a small animal (e.g., a rodent, insect, snake, etc.), a hair clump, or decayed matter. These and other shortcomings of the prior art are addressed by the present disclosure.

SUMMARY

A skimmer basket assembly is disclosed that includes a basket. The bottom of the basket may include one or more flaps, by which the contents of the basket may be evacuated when opened. A handle may be connected to the basket via one or more connectors. The handle may include a trigger mechanism that is mechanically linked to the one or more flaps of the basket. The trigger mechanism may be manipulated to effectuate the opening of the one or more flaps of the basket. The skimmer basket assembly may further include a lid that is slidingly connected to the one or more connectors. The lid may be configured to accommodate the handle therein, such as when the skimmer basket assembly is in place in a skimmer basket well, for example. The lid may further be configured to substantially cover a top opening of the basket, such as when the skimmer basket assembly is lifted out of a skimmer basket well, for example.

BRIEF DESCRIPTION OF THE DRAWINGS

The following detailed description is better understood when read in conjunction with the appended drawings. For the purposes of illustration, exemplary examples are shown in the drawings; however, the subject matter is not limited to the specific elements and instrumentalities disclosed. In the drawings.

DETAILED DESCRIPTION OF ILLUSTRATIVE EMBODIMENTS

Described herein is a skimmer basket assembly that may be used with a swimming pool filtration system.

In describing embodiments of the present disclosure illustrated in the figures, specific terminology is employed for the sake of clarity. The disclosure, however, is not intended to be limited to the specific terminology so selected, and it is to be understood that each specific element includes all technical equivalents that operate in a similar manner to accomplish a similar purpose.

Figure 1:
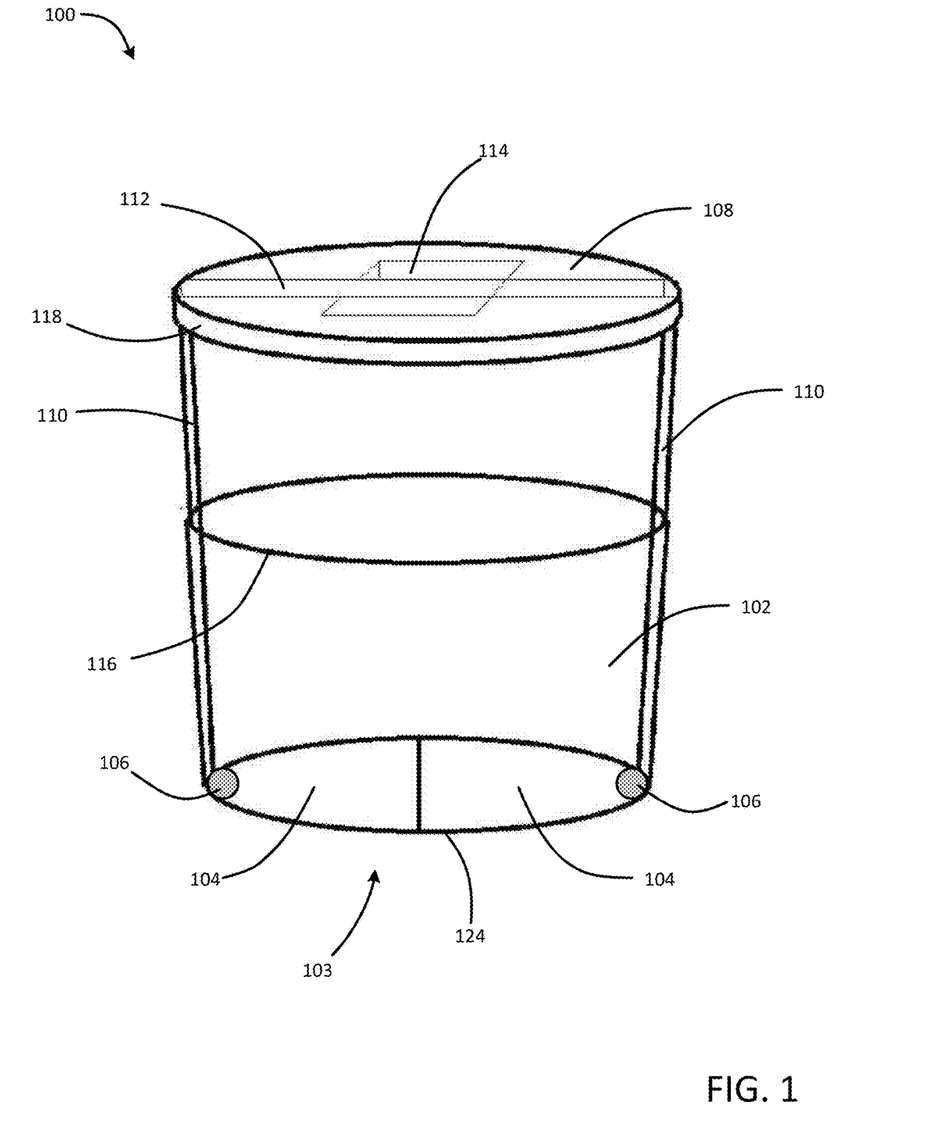
FIG. 1 illustrates a perspective view of an exemplary skimmer basket assembly.

FIG. 1 is a perspective view of an example skimmer basket assembly 100. The skimmer basket assembly 100 may include a basket 102. The basket 102 is depicted as transparent in FIGS. 1-3 for illustrative purposes. The basket 102 may be cylindrical, cube-shaped, or other shape. The basket 102 may be tapered such that, for example, the top portion of the basket 102 is wider than the bottom portion of the basket 102. Since the basket 102 may serve to trap larger debris, such as sticks, leaves, hair clumps, etc., the basket 102 may contain a plurality of holes, slots, or other similar openings that are sized and positioned to allow water and small particles to flow through the basket 102, while still retaining the larger debris within the basket 102. The basket 102 may be composed of any material that is unlikely to corrode or rust in water, such as plastic or stainless steel.

The skimmer basket assembly 100 may include a lid 108, which may be configured in a shape corresponding to the shape of the basket 102 such that the lid 108 substantially covers the opening at the top of the basket 102 when placed against the top of the basket 102. As examples, the lid 108 may be a circular shape in an embodiment containing a cylindrical basket 102, a square shape in an embodiment containing a cube-shaped basket 102, and so forth. The lid 108 may be sized so that a portion of the lid 108, such as a lip 118, rests against a surface, such as the pool deck, defining the opening to the skimmer basket well, such as the skimmer basket well 402 (FIGS. 4 and 5), in which the basket 102 may be situated. Alternatively, the lid 108 may be sized to rest upon a shelf, ledge, or other projection within the skimmer basket well. In an aspect, the lid 108 may be dome-shaped.

The lip 118 may be formed around the edge or periphery of the lid 108. The lip 118 of the lid 108 may be configured to interconnect with a rim 116 of the basket 102. For example, the lip 118 of the lid 108 may be of a slightly larger diameter than the rim 116 of the basket 102 and fit around the rim 116 of the basket 102. The lid 108 may be composed of plastic, stainless steel, or other corrosion- or rust-resistant material.

Figure 2:
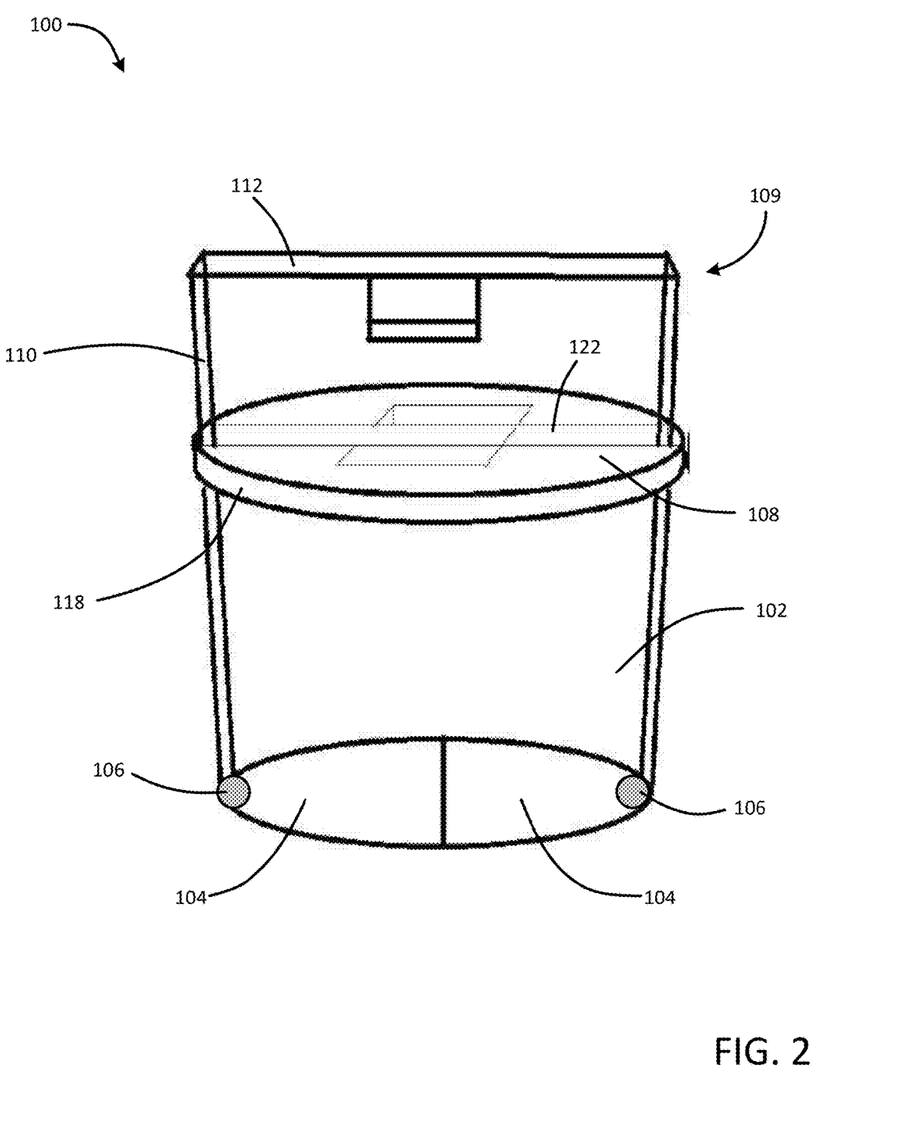
FIG. 2 illustrates a perspective view of an exemplary skimmer basket assembly.

The lid 108 may be connected to the basket 102 via a handle assembly 109 (FIG. 2). The handle assembly 109 may include a handle 112 and one or more connectors 110. The upper end of each of the connectors 110 may be attached to distal ends of the handle 112 and the lower end of each of the connectors 110 may be attached to the basket 102. In an aspect, the lower end of each of the connectors 110 may attach to or be incorporated within the basket 102 and extend to a bottom 103 of the basket 102. Each of the connectors 110 may be substantially normal to the handle 112. The handle 112 may fit within the top of the lid 108, such as being recessed within a groove 122 (shown in FIG. 2) running across the lid 108. The handle 112 may be substantially flush with the top of the lid 108. The lid 108 may include a recess 114 configured to accommodate a user's hand to facilitate the grasping of the handle 112. The recess 114 may be configured to accommodate a trigger mechanism (not visible in FIG. 1 and discussed further herein). The lid 108 may be slidingly displaced along the connectors 110 between the handle 112 and the rim 116 of the basket 102.

FIG. 2 is a perspective view of the example skimmer basket assembly 100 that illustrates the displacement of the lid 108 along the connectors 110. When a user lifts up the skimmer basket assembly 100 by the handle 112, connectors 110 may slide through lid 108, such as via one or more openings in the lid 108, and the connected basket 102 may be lifted. The lid 108 may remain substantially stationary within or upon the skimmer basket well until the basket 102 is lifted into contact with the lid 108. When the basket 102 is lifted into contact with the lid 108, the entire skimmer basket assembly 100 may be lifted out of the skimmer basket well. When the basket 102 is raised into contact with the lid 108, the lid 108 may secure the contents of the basket 102. In this manner, the user may be shielded, visually and/or physically, from any undesirable object that may be in the basket 102. For example, if a live snake was caught in the basket 102, the snake would be unable to physically contact the user while the basket 102 is lifted since the lid 108 may remain in place during the lifting process and after the skimmer basket assembly 100 is removed since the lid 108 may cover the top of the basket 102.

Returning to FIG. 1, the bottom 103 of the basket 102 may include one or more flaps 104. Like the basket 102, the one or more flaps 104 may each contain a plurality of holes, slots, or other similar openings that are sized and positioned to allow water and small particles to flow through the flap 104 while preventing large debris from flowing through the flap 104.

In an aspect, the basket 102 may include a pair of flaps 104 that are each connected to opposite sides of the basket 102, such as at a bottom rim 124 of the basket 102, via a hinge 106, as depicted in FIG. 1. The flaps 104 may be configured to open downwards from the basket 102. When closed, the flaps 104 may form a flat surface of the bottom 103 of the basket 102 and may be flush to each other and the bottom rim 124 of the basket 102. When the flaps 104 are closed, the flaps 104 may be configured so that large debris (i.e., debris too large to fit through the holes, slots, or other similar opening in the basket 102) is unable to escape the basket 102. But when the flaps 104 are opened, the flaps 104 may be configured so that any large debris may fall out of the bottom 103 of the basket 102.

In another aspect, the basket 102 may include a single flap 104 connected to the basket 102, such as the bottom rim 124, via a hinge 106. The flap 104 may be configured to open downwards from the basket 102 and, when closed, the flap 104 may be flush with the bottom rim 124 of the basket 102. The flap 104 may be configured so that when the flap 104 is closed, large debris is retained in the basket 102, but when the flap 104 is open, large debris may fall out of the bottom 103 of the basket 102.

One or more of the flaps 104 may be held in a closed position (i.e. flush with the bottom rim 124 of the basket 102) until the user causes one or more of the flaps 104 to be opened. For example, a spring attached to or disposed within one or more of the hinges 106 may cause one of more of the flaps 104 to be held in a closed position.

Figure 3:
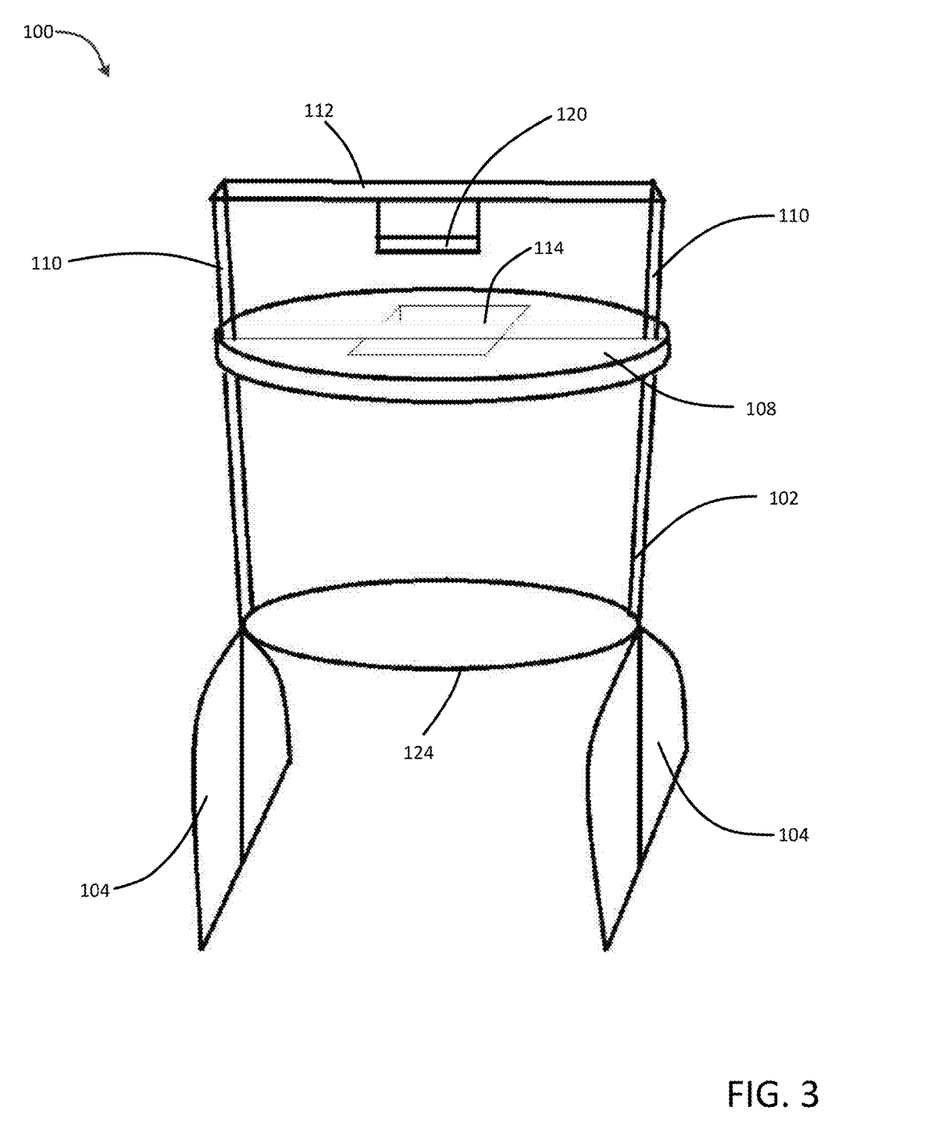
FIG. 3 illustrates a perspective view of an exemplary skimmer basket assembly.

FIG. 3 is a perspective view of the example skimmer basket assembly 100 showing an operation of the flaps 104 while the flaps 104 are in the open position. The handle 112 may include a trigger mechanism 120 by which the user may operate one or more flaps 104. The trigger mechanism 120 may fit within the recess 114, such as when the skimmer basket assembly 100 is in place in the skimmer basket well and the handle 112 is disposed within the lid 108. The trigger mechanism 120 may be mechanically linked to the flaps 104 to effectuate the flaps' 104 operation. For example, one or more cable linkages may traverse the handle 112, the connectors 110, and/or the basket 102 and connect the trigger mechanism 120 to one or more flaps 104. The user may manipulate the trigger mechanism 120, such as after removing the skimmer basket assembly 100 from the skimmer basket well, to open the flaps 104 and allow the contents of the basket 102 to fall out of the bottom 103 of the basket 102. As an example, if the basket 102 contained a dead rodent, the user may hold the basket 102 over a waste receptacle, squeeze the trigger mechanism 120 to open the flaps 104, and deposit the dead rodent in the waste receptacle from the now-open bottom 103 of the basket 102. This functionality may allow the user to eliminate or minimize contact with the dead rodent or even seeing the dead rodent.

Figure 4:
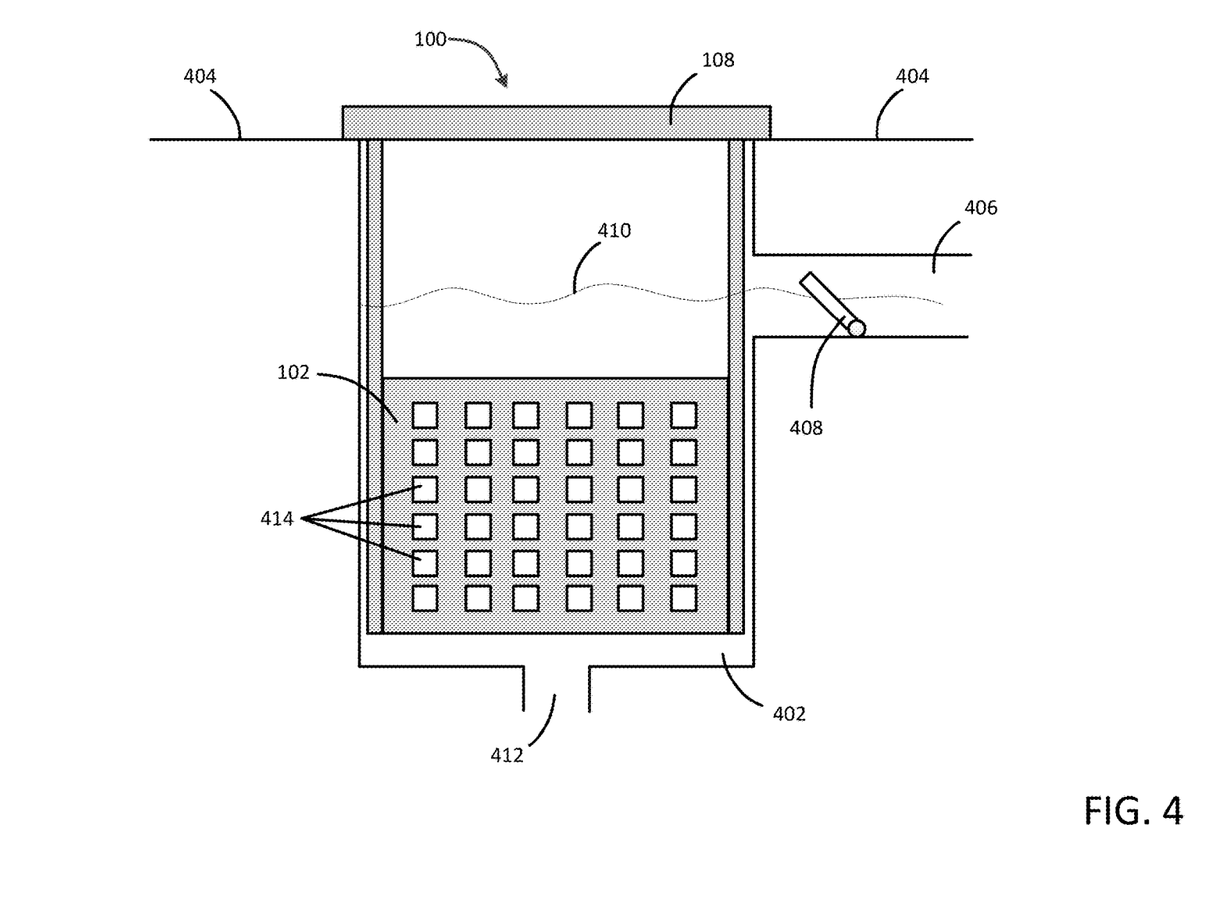
FIG. 4 illustrates a side view of an exemplary skimmer basket assembly in place in a skimmer basket well.

FIG. 4 is a side view of the example skimmer basket assembly 100 positioned in a skimmer basket well 402. The skimmer basket well 402 may be within a deck 404 of a pool. The water from the pool may flow into the skimmer basket well 402 via an input channel 406. A weir 408 positioned within the input channel 406 may prevent the backflow of water from the skimmer basket well 402 to the pool. The water may flow through the basket 102 and out the output channel 412, which may lead to additional filtering elements such as a small-particle filter. The skimmer basket assembly 100 may be positioned within the skimmer basket well 402 and/or configured so that the basket 102 is submerged below a waterline 410, as shown in FIG. 4, or so that the basket 102 is only partially submerged below the waterline 410. As depicted, the lid 108 may be configured so that it rests upon and is supported by the deck 404.

Also depicted in FIG. 4 are one or more openings 414 defined in the basket 102. The openings 414 may include holes or slots, for example, configured to allow water and other small particles to flow through the basket 102 but not larger particles, such as leaves, sticks, hair clumps, and so forth. The openings 414 may also be defined in one or more of the flaps 104. Each of the openings 414 may be square-shaped or circle-shaped, for example. The width or diameter, respectively, of the opening 414 in a square shape or a circle shape may be in the ranges of 0.1 to 1 inch, 0.2 to 0.8 inch, or 0.4 to 0.6 inch. It will be appreciated that not all openings 414 in FIG. 4 are labeled as such.

Figure 5:
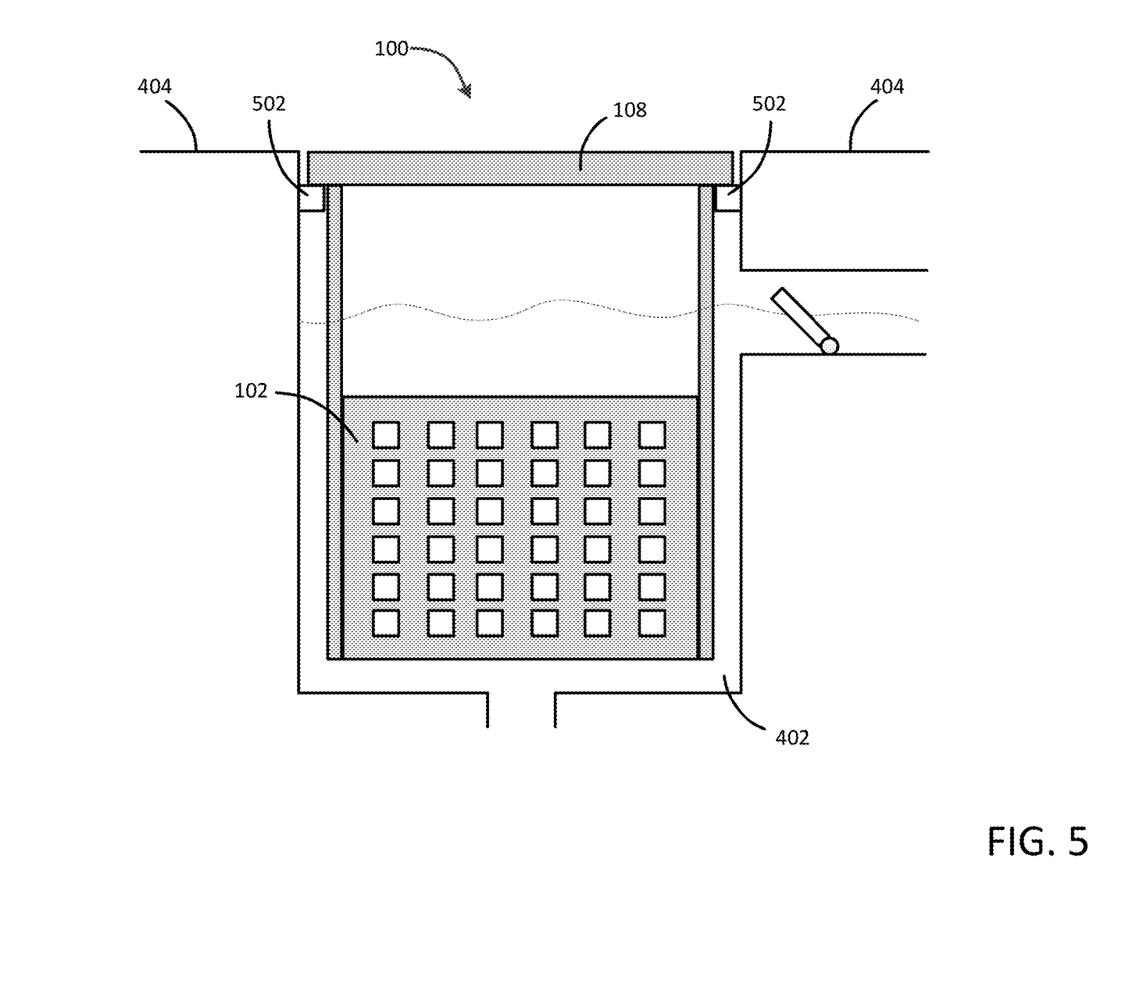
FIG. 5 illustrates a side view of an exemplary skimmer basket assembly in place in a skimmer basket well.

Similar to FIG. 4, FIG. 5 is a side view of the example skimmer basket assembly 100 positioned in the skimmer basket well 402. The skimmer basket well 402 may include one or more projections 502, upon which the lid 108 of the skimmer basket assembly 100 may be positioned and supported by. The projections 502 and the lid 108 may be configured so that the top of the lid 108 is substantially flush with the deck 404.

Figure 6:
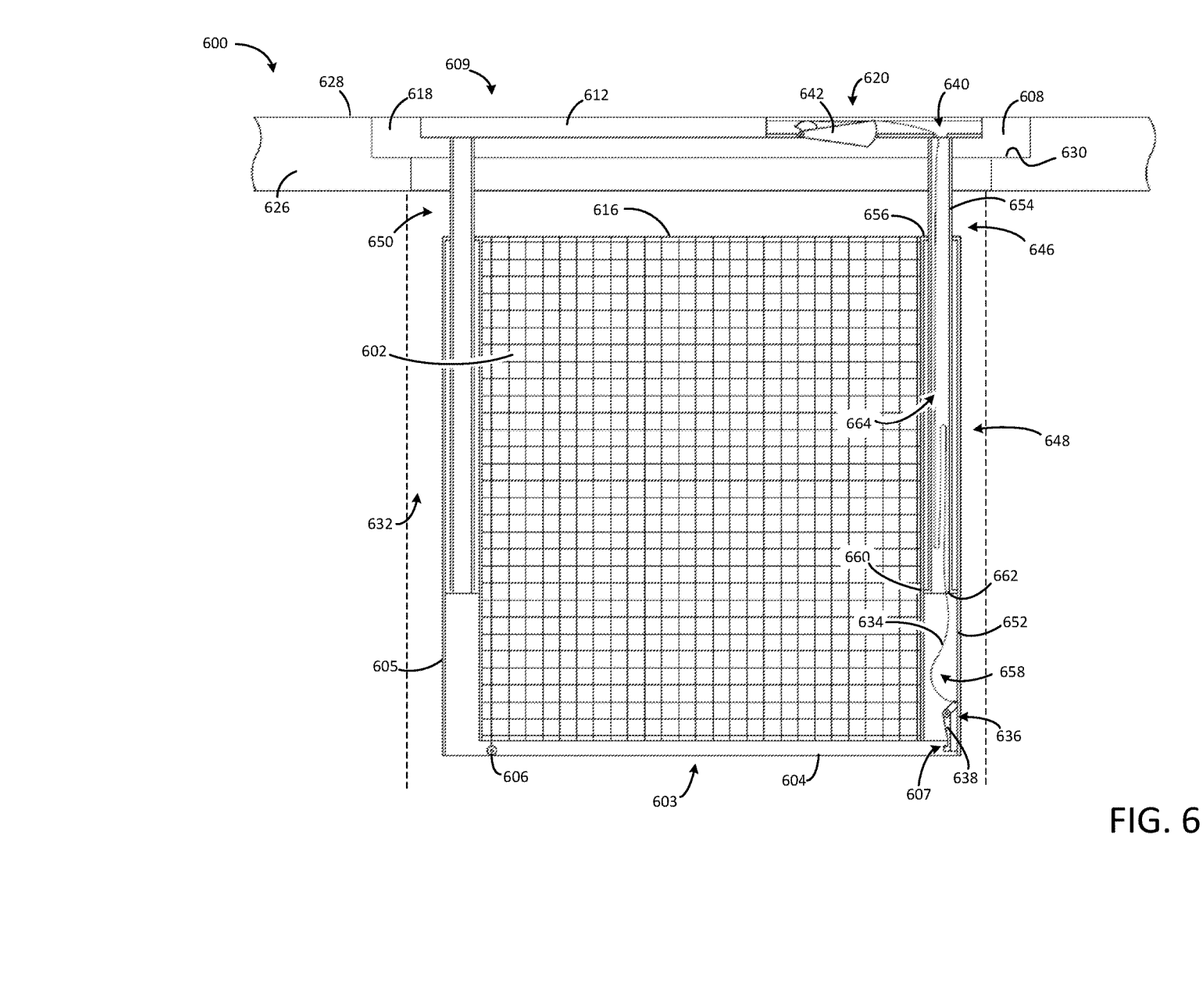
FIG. 6 illustrates a cross-sectional side view of an exemplary skimmer basket assembly.
Figure 7:
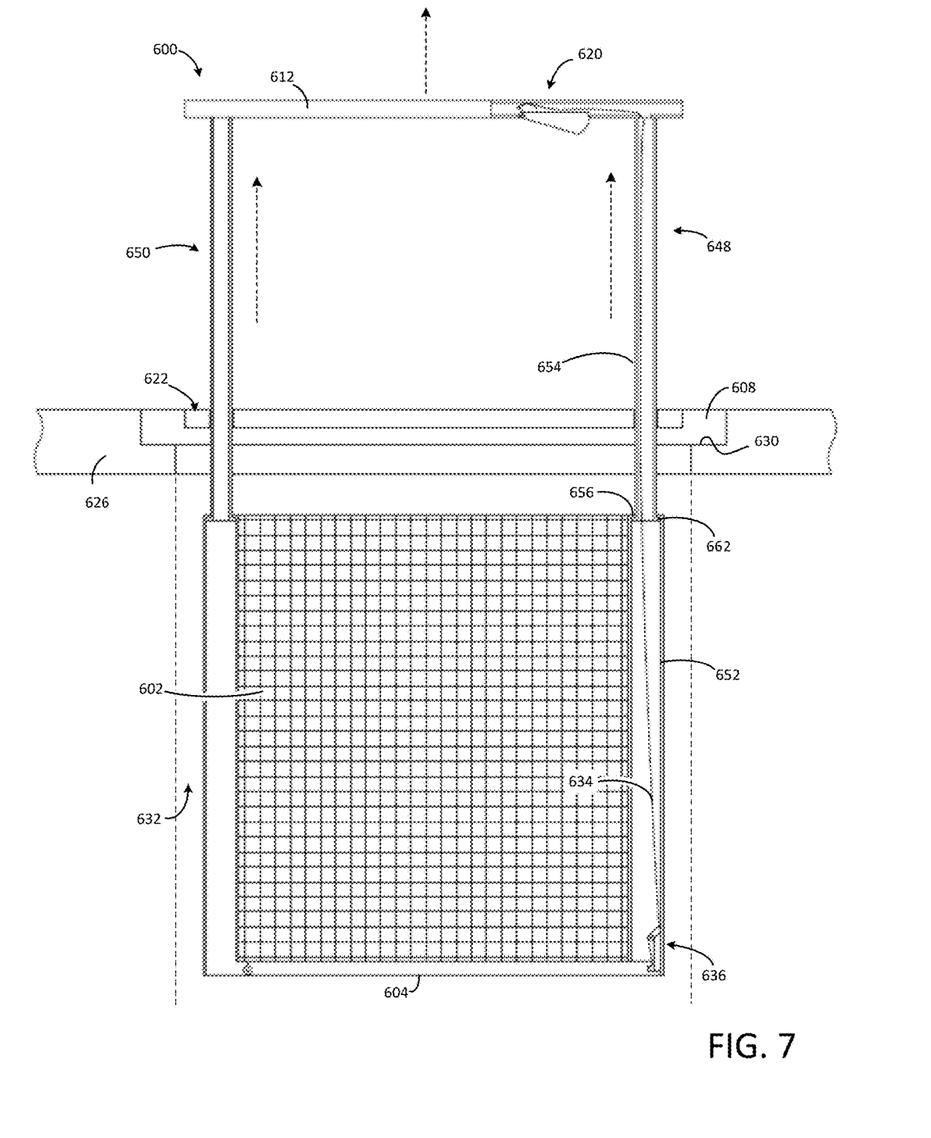
FIG. 7 illustrates a cross-sectional side view of an exemplary skimmer basket assembly in place in a skimmer basket well.
Figure 8:
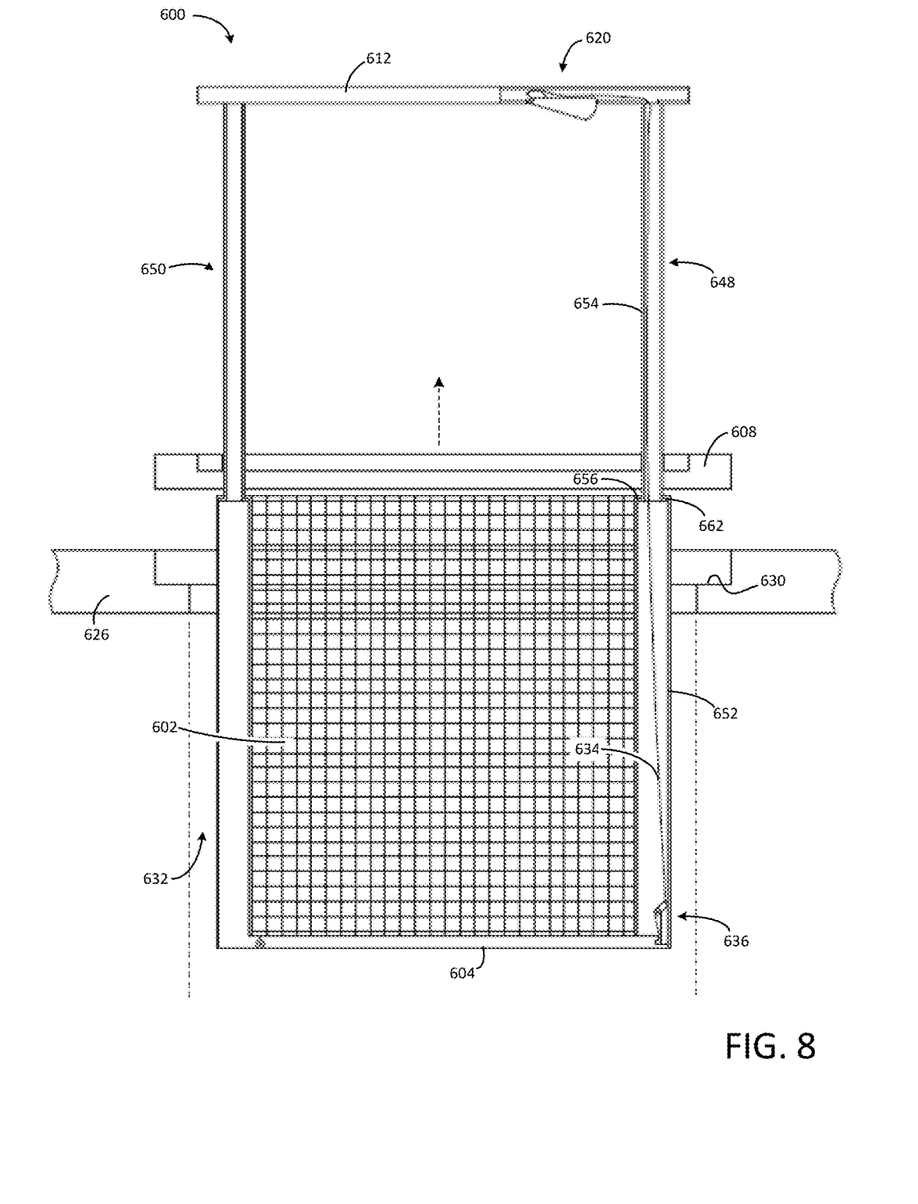
FIG. 8 illustrates a cross-sectional side view of an exemplary skimmer basket assembly partially removed from a skimmer basket well

FIGS. 6-8 illustrates cut-away side views of an example skimmer basket assembly 600 comprising one or more connectors configured to selectively expand and/or contract (e.g., telescoping connectors). The skimmer basket assembly 600 may be similar in some aspects with the skimmer basket assembly 100 shown in FIGS. 1-5.

The skimmer basket assembly 600 may include a basket 602, a lid 608, a flap 604 and a handle assembly 609. The handle assembly 609 may comprise a trigger assembly 620 and a telescoping connector assembly 646.

The basket 602 may be formed in a generally cylindrical shape with the sides 605 of the basket 602 configured with a number of holes, slots, or the like designed to allow water and smaller debris to pass through the basket 602 yet still capture larger debris therein. The lid 608 may be sized and shaped to substantially cover the top opening of the basket 602 defined by the upper rim 616 of the basket 602. The lid 608 may include a lip 618 formed around the periphery of the lid 608. The lip 618 may be sized and shaped to overlap, at least in part, with the upper rim 616 (e.g., the outer periphery of the upper rim 616) when the lid 608 is engaged with the basket 602. The lid 608 may be configured with one or more opening through which one or more connectors, spanning from the basket 602 to a handle 612, may freely slide.

The handle assembly 609 may include the handle 612 by which a user may grasp and/or operate the skimmer basket assembly 600. When the skimmer basket assembly 600 is deployed in a skimmer basket well 632, the handle 612 may rest in a groove 622 of the lid 608, which may be also formed with a recess to accommodate a user's hand.

A trigger assembly 620 may be provided in association with the handle assembly 609. As shown in FIGS. 6-9, the trigger assembly 620 may be positioned, at least in part, within an interior space 640 of the handle 612. A trigger 642 of the trigger assembly 620 may protrude, at least in part, from the handle 612. The trigger assembly 620 may be operated to open a flap 604 (or more than one flap in some embodiments) and allow debris to fall from the basket 602. For example, a user may depress or otherwise actuate the trigger 642 to cause the flap 604 to open.

The trigger assembly 620 may operate the flap 604 via an operative connection to a release, such as a latch assembly 636, configured to selectively cause the flap 604 to open. The latch assembly 636 may engage the flap 604 when the flap 604 is in a closed position. In some aspects, the operative connection may be a mechanical connection. For example, the trigger assembly 620 may operate the flap 604 via a flexible line, such as a wire, cable, chain, string, or the like. In FIGS. 6-9, the flexible line is represented by a cable 634. In use, operation or manipulation of the trigger assembly 620 (e.g., actuation or manipulation of the trigger 642) may exert a pulling force on the cable 634, causing a latch arm 638 of the latch assembly 636 to disengage with an indentation 607 (or other structural configuration) in the periphery of the flap 604. When the flap 604 is disengaged from the latch arm 638, the flap 604 is opened downward (e.g., downward rotation about the hinge 606). The downward motion of the flap 604 may be caused by gravity and/or another force, such as a spring. For example, the hinge 606 may be a spring hinge. The skimmer basket assembly 600 is configured with a single flap 604 but instead may be configured with two or more flaps, such as is seen in FIGS. 1-3.

In one aspect, the skimmer basket assembly 600 may be configured with two or more flaps 604 and two or more corresponding latch assemblies 636. The trigger assembly 620 may be mechanically coupled to each latch assembly 636. For example, a first cable 634 may mechanically couple the trigger assembly 620 with a first latch assembly 636 corresponding to a first flap 604 and a second cable 634 may mechanically couple the trigger assembly 620 with a second latch assembly 636 corresponding with a second flap 604. Upon actuation of the trigger assembly 620, the first and second cables 634 may act on the first and second latch assemblies 636 to cause to open the first and second flaps 604, respectively. Alternatively, the skimmer basket assembly 600 may comprise two or more trigger assemblies 620, each mechanically coupled to a corresponding latch assembly 636.

The handle 612 may be mechanically connected to the basket 602 via expandable connector, such as a telescoping connector assembly 646. As will be discussed further herein, the telescoping connector assembly 646 may allow additional flexibility in the use of the skimmer basket assembly 600. For example, the skimmer basket assembly 600 may be used with skimmer basket wells having variable depths.

The telescoping connector assembly 646 is configured to provide a variable length connection between the handle 612 and the basket 602. For example, the telescoping connector assembly 646 may include one or more elongate connectors configured to change their respective lengths, including their respective lengths between the handle 612 and the basket 602. For example, the one or more connectors may expand to increase a distance between the upper rim 616 of the basket 602 and the handle 612. Conversely, the one or more connectors may contract to decrease the distance between the upper rim 616 of the basket 602 and the handle 612. In the skimmer basket assembly 600, the telescoping connector assembly 646 may comprise one or more connectors, including a first connector 648 and a second connector 650, although the telescoping connector assembly 646 instead may be configured with a single connector or two or more connectors.

Each of the first connector 648 and the second connector 650 may be attached on their respective upper ends to the handle 612. For example, the vertical elongate axes of the first connector 648 and the second connector 650 each may be normal to the horizontal elongate axis of the handle 612. The lower portions of the first connector 648 and the second connector 650 may be attached to the basket 602. For example, the first connector 648 and/or the second connector 650 may be attached to an inner surface of the side 605 of the basket 602, as shown in FIGS. 6-9. The portions of the first connector 648 and/or the second connector 650 that are attached to the basket 602 may vertically span from the upper rim 616 of the basket 602 to the bottom rim 624 of the basket 602. In some aspects, the first connector 648 and/or the second connector 650 may be attached to the outer surface of the side 605 of the basket 602. The first connector 648 and the second connector 650 each may be further configured to pass through respective openings in the lid 608 to enable free movement of the lid 608 along the respective lengths of the first connector 648 and the second connector 650 (and/or the first connector 648 and the second connector 650 may be considered to move freely through the openings in the lid 608).

Discussion shall now be had with respect to the first connector 648, although such features and descriptions may be equally applied to the second connector 650 and/or additional connectors. Generally, the first connector 648 may comprise a first elongate component and a second elongate component. The first and second elongate components may be slidingly coupled with one another. The sliding coupling may comprise sliding movements, relative to one another, along elongate axes of the first elongate component and/or the second elongate component. For example, the first elongate component may be configured with a hollow interior and the sliding coupling may be effectuated by the second elongate component extending out of and/or retracting into the hollow space of the first elongate component. In this manner, the first connector 648 may expand and contract with respect to the first connector's 648 elongate dimension (e.g., length).

In an example embodiment, the first connector 648 may be configured as a series of extendable telescopic cylinders, with each successive cylinder have a progressively smaller diameter than the last. As illustrated in FIGS. 6-9, the first connector 648 is configured with a vertically-oriented, elongate inner cylinder 654 nested within a vertically-oriented, elongate outer cylinder 652. The inner cylinder 654 and the outer cylinder 652 may be of approximately the same length as one another, although the disclosure is not so limited. The top portion of the inner cylinder 654 may extend through the opening in the lid 608 and attach to the handle 612. As the handle 612 is raised or depressed, the inner cylinder 654 is likewise raised or depressed. The outer cylinder 652 may be fixed to the basket 602. For example, the outer cylinder 652 may be fixed to the inner surface of the side 605 of the basket 602. In other aspects, the outer cylinder 652 may be fixed to the outer surface of the side 605 of the basket 602. The vertical length of the outer cylinder 652 may substantially correspond with the vertical height of the side 605 of the basket 602.

The inner cylinder 654 and/or the outer cylinder 652 each may be hollow. Thus, the inner cylinder 654 may define an interior space 664 and the outer cylinder 652 likewise may define an interior space 658. The inner cylinder 654 may slide freely within the outer cylinder 652 along their respective elongate axes to selectively extend or shorten the overall length of the first connector 648, as the case may be. The inner cylinder 654 may be configured with a bottom end cap 660 at the end of the inner cylinder 654 distal from the junction of the inner cylinder 654 with the handle 612. The bottom end cap 660 may comprise a flange 662 having an outer diameter that results in the outer periphery of the flange 662 being generally flush with the inner surface of the outer cylinder 652, yet still allowing free movement of the inner cylinder 654 within the outer cylinder 652. The bottom end cap 660 of the inner cylinder 654 and/or the flange 662 may define a bottom opening to the interior space 664 of the inner cylinder 654.

The upper end of the outer cylinder 652, proximate the upper rim 616 of the basket 602, may be configured with an upper end cap 656. The upper end cap 656 of the outer cylinder 652 may define an opening to the interior space 658 of the outer cylinder 652. The inner periphery of said opening in the upper end cap 656 of the outer cylinder 652 may be sized to provide a flush fit with the outer surface of the inner cylinder 654 while still allowing free movement of the inner cylinder 654 through the opening. The opening in the upper end cap 656 of the outer cylinder 652 and the flange 662 at the opposite end of the inner cylinder 654 may provide internal support for the inner cylinder 654 while the inner cylinder 654 extends and retracts. In addition, the flange 662 of the inner cylinder 654 and the upper end cap 656 of the outer cylinder 652 together may act as a stop (e.g., via the respective sizes of the flange 662 and the upper end cap 656) to prevent the inner cylinder 654 from being completely pulled from the outer cylinder 652 when the first connector 648 is fully extended. For example, the top surface of the flange 662 may come into contact with and be blocked by the bottom surface of the upper end cap 656 that surrounds the opening in the upper end cap 656. When the skimmer basket assembly 600 is pulled from the well 632, the basket 602 may be supported by the contact between the flange 662 and the upper end cap 656.

The first connector 648 (e.g., the outer cylinder 652 and the inner cylinder 654) may be configured for cooperative operation with the trigger assembly 620 and the latch assembly 636. For example, the top end of the inner cylinder 654 may be configured with an opening corresponding with an opening in the handle 612, thus connecting the interior space 640 of the handle 612 with the interior space 664 of the inner cylinder 654. It is already noted that the bottom end cap 660 of the inner cylinder 654 is open to the interior space 658 of the outer cylinder 652. The cable 634 may be attached at one end to the trigger assembly 620 and lead through the interior space 640 of the handle 612, through the interior space 664 of the inner cylinder 654, and finally to the interior space 658 of the outer cylinder 652. The opposite end of the cable 634 may be attached to the latch assembly 636, which may be situated at the bottom of the interior space 658 of the outer cylinder 652 or otherwise situated in association with the outer cylinder 652. The cable 634 may be configured with a length at which the cable 634 is taut between the trigger assembly 620 and the latch assembly 636 when the first connector 648 and the second connector 650 are fully extended, thus enabling the trigger assembly 620, upon manipulation, to actuate the latch assembly 636 and release the flap 604. When the skimmer basket assembly 600 is not in this extended configuration, such as seen in FIG. 6, the cable 634 may exhibit a degree of slack. The slack portions of the cable 634 may be folded back on itself or otherwise disposed in one or more of the interior spaces through which the cable 634 leads.

The use and operation of the skimmer basket assembly 600 shall now be described with sequential reference to FIGS. 6-9. In FIG. 6, the skimmer basket assembly 600 is deployed in association with the skimmer basket well 632, e.g., to filter debris from water as it passes through the basket 602. The basket 602 is positioned within the well 632 and the bottom 603 of the basket 602 may be supported by a bottom surface (not shown) of the well 632. The lid 608 is supported by a shelf 630 formed in the deck 626. The top surface of the lid 608 may be level with the top surface 628 of the deck 626. In this resting position, the first connector 648 and the second connector 650 may be extended to the length permitted by the relative distance between the lid 608 and the bottom surface (if any and/or at a sufficiently high position) of the well 632. In FIG. 6, the first connector 648 and the second connector 650 are neither fully extended nor fully retracted. In some instances, however, the bottom surface of the well may be at a depth, relative to the bottom 603 of the basket 602, such that the bottom 603 of the basket 602 does not contact the bottom of the well 632 when the first connector 648 and the second connector 650 are fully extended. In yet other instances, the bottom 603 of the basket 602 may contact the bottom surface of the well 632 when the first connector 648 and the second connector 650 are both in fully-retracted configurations.

In FIG. 7, the process has begun to lift the skimmer basket assembly 600 out of the well 632. For example, the basket 602 may be full of debris and ready to be emptied. The handle 612 is lifted upward, causing a corresponding extension of the first connector 648 and the second connector 650. For example, raising the handle 612 causes the inner cylinder 654 to move upward in relation to the outer cylinder 652 and the basket 602 in general, both of which thus far have remained substantially stationary. Such movements of the handle 612, the first connector 648, and the second connector 650 are indicated by the dotted arrows in FIG. 7. The inner cylinder 654 has been extended to the point where the flange 662 of the inner cylinder 654 abuts the upper end cap 656 of the outer cylinder 652. Since the first connector 648 and the second connector 650 are both fully extended, the cable 634 is taught between the trigger assembly 620 and the latch assembly 636, allowing for actuation of the latch assembly 636 via the cable 634. In addition, the inner cylinder 654 and the counterpart inner cylinder of the second connector 650 have slid through the opening in the lid 608, leaving the lid 608 substantially stationary and still resting on the shelf 630 of the deck 626.

In FIG. 8, the handle 612 is continued to be pulled upwards. Since the first connector 648 and the second connector 650 are both fully extended (e.g., the flange 662 of the inner cylinder 654 abuts the upper end cap 656 of the outer cylinder 652), the basket 602 is likewise pulled upwards. The basket 602, in turn, contacts the lid 608 (e.g., the bottom of the lid 608), causing upward movement of the lid 608 and, thus, disengagement of the lid 608 with the deck 626 (e.g., the shelf 630 of the deck 626). The movement of the lid 608 is indicated in FIG. 8 by the corresponding arrow.

Figure 9:
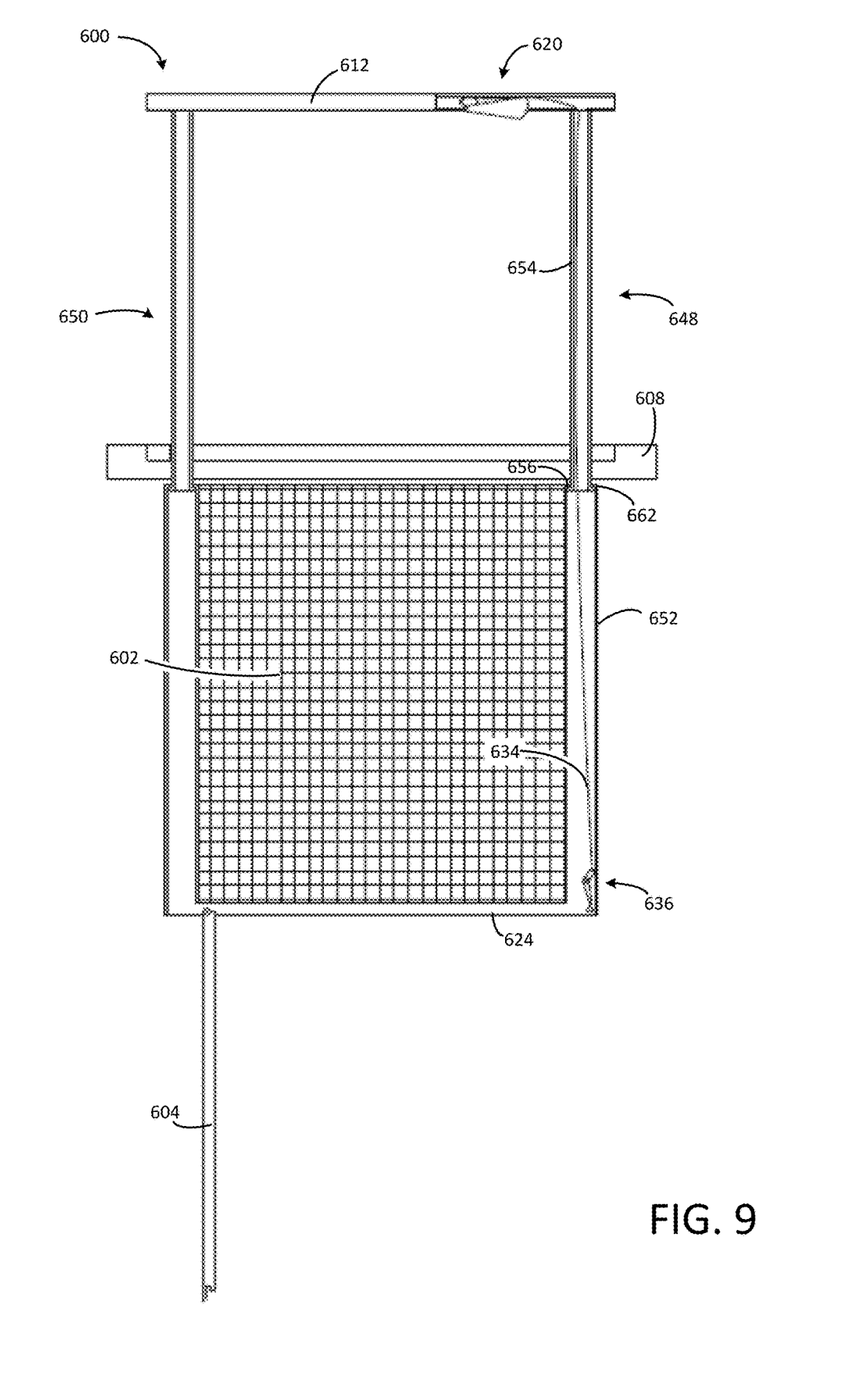
FIG. 9 illustrates a cross-sectional side view of an exemplary skimmer basket assembly removed from a skimmer basket well.

In FIG. 9, the handle 612 has been pulled further upwards, causing likewise upwards movement of the lid 608 and basket 602 (e.g., the skimmer basket assembly 600 as a whole). The skimmer basket assembly 600 may be raised clear of the well 632 and the deck 626. For example, the skimmer basket assembly 600 may be positioned over a garbage receptacle in anticipation of emptying the contents of the basket 602. Once in position, for example, the flap 604 may be opened to allow the contents of the basket 602 to empty downwards. For example, the latch assembly 636 may be actuated to disengage with the flap 604. The actuation of the latch assembly 636 may be caused, for example, by a corresponding actuation of the trigger assembly 620, which is connected to the latch assembly via the cable 634.

The flap 604 may be again secured in the flap's 604 closed position and the skimmer basket assembly 600 may be placed back in the well 632.

Figure 10A:
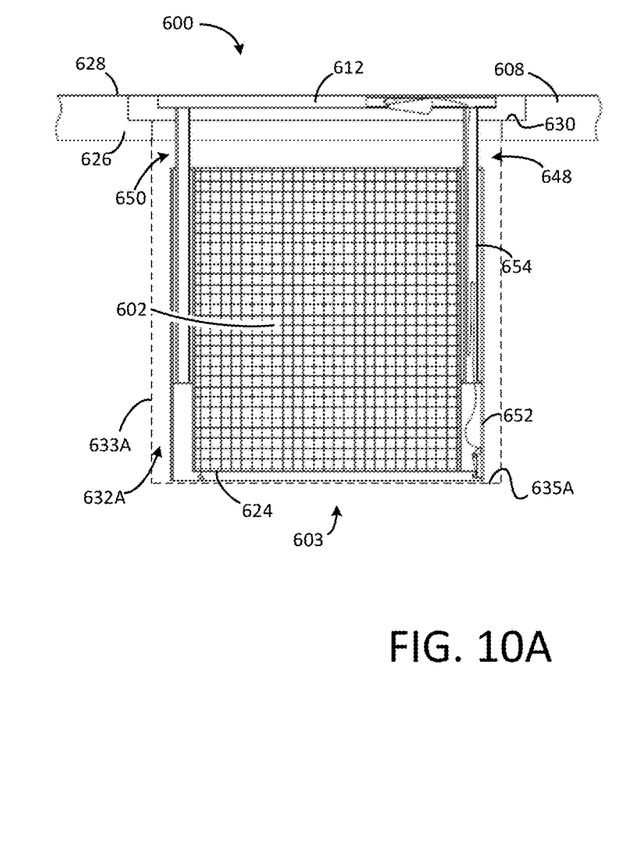
FIG. 10A illustrates a cross-sectional side view of an exemplary skimmer basket assembly in place in a skimmer basket well.
Figure 10B:
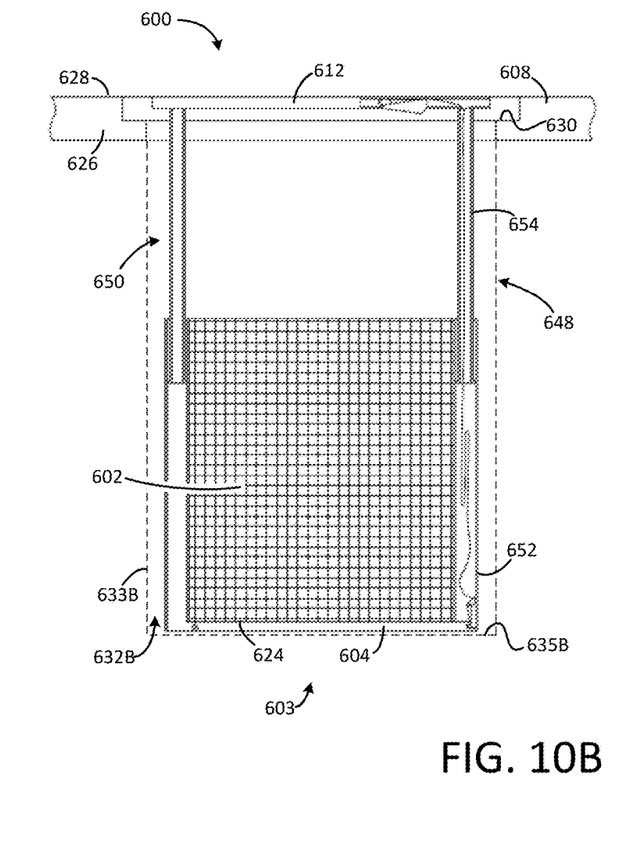
FIG. 10B illustrates a cross-sectional side view of an exemplary skimmer basket assembly in place in a skimmer basket well.

FIGS. 10A and 10B illustrate the skimmer basket assembly 600 deployed in several skimmer basket wells having variable depths. In particular, FIGS. 10A and 10B each show the skimmer basket assembly 600 positioned in the well 632A (FIG. 10A), 632B (FIG. 10B), with the bottom 603 of the skimmer basket assembly 600 resting on the bottom surface 635A (FIG. 10A), 635B (FIG. 10B) of the well 632A, 632B. For example, at least a portion of the bottom rim 624 of the basket 602 may be in contact with at least a portion of the bottom surface 635A, 635B of the well 632A, 632B. Additionally or alternatively, at least a portion of the flap 604 may be in contact with at least a portion of the bottom surface 635A, 635B of the well 635A, 635B. The bottom surface 635A, 635B of the well 632A, 632B may include an opening (not shown) that forms an output channel (e.g., the output channel 412 in FIG. 4) for the water in the well 632A, 632B. The depth of the well 632A in FIG. 10A is shallower then the depth of the well 632B in FIG. 10B. That is, the vertical height of the sidewall 633A of the well 632A in FIG. 10 is less than the vertical height of the sidewall 633B of the well 632B in FIG. 11B. The depth of the well 632A, 632B and/or the vertical height of the sidewall 633A, 633B may be measured from the top surface of the shelf 630, the top surface 628 of the deck 626, or other point of reference.

In FIG. 10A, with the shallower well 632A, the first connector 648 and the second connector 650 are partially extended (e.g., the inner cylinder 654 is only partially nested within the outer cylinder 652) when the skimmer basket assembly 600 is positioned in the well 632A. In FIG. 10B, with the deeper well 632B, the first connector 648 and the second connector 650 are also partially extended, but to a greater degree than in FIG. 10A. The degree of extension (or, conversely, the degree of compaction/retention) of the first connector 648 and the second connector 650 is limited by the handle's 612 engagement with the lid 608 and, in turn, the lid's 608 engagement with the shelf 630 of the deck 626. For example, the downward movement (or position) of the inner cylinder 654 corresponds with the downward movement (or position) of the handle 612 and the downward movement (or position) of the handle 612 is limited by the lid 608. The downward movement (or position) of the lid 608 is limited by the deck 626 (e.g., the surface 628 of the deck 626 or the shelf 630).

In other instances (not shown), the first connector 648 and the second connector 650 may exhibit no or almost no extension (i.e., are fully or almost fully compact) when the skimmer basket assembly 600 is positioned with the well 632. This may be the case when the depth of the well 632 corresponds or almost corresponds with the vertical height of the side 605 of the basket 602. In yet other instances, the first connector 648 and the second connector 650 may be fully or almost fully extended when the skimmer basket assembly 600 is positioned within the well 632. This may occur when the bottom 603 of the basket 602 is unable to contact the bottom surface 635A, 635B of the well 632 due to the greater depth of the well 632. For example, the first connector 648 and the second connector 650 may be fully extended when the depth of the well 632 exceeds the combined elongate, vertical lengths of the inner cylinder 654 and the outer cylinder 652 (or about thereof).

FIGS. 10A and 10B illustrate the flexibility provided by the skimmer basket assembly 600 to adapt to various sizes of skimmer basket wells. As a non-limiting example, in the two variable configurations of the wells 632A, 632B shown in FIGS. 10A and 10B, the bottom 603 of the basket 602 rests on or near the bottom surface 635A, 635B of the well 632A, 632B. Recalling that the bottom surface 635A, 635B may define or include an opening that forms an output channel (e.g., the output channel 412 of FIG. 4), the relative positioning of the basket 602 and the bottom surface 635A, 635B of the well 632A, 632B may further facilitate, at least in part, the debris filtering provided by the skimmer basket assembly 600. As another non-limiting example, the flush fit of the handle 612 and the lid 608 and/or the flush fit of the lid 608 and the deck 626 (e.g., the surface 628 and/or the shelf 630 of the deck 626) when the skimmer basket assembly 600 is deployed may be further facilitated by the extendable characteristic of the first connector 648 and the second connector 650.

Figure 11A:
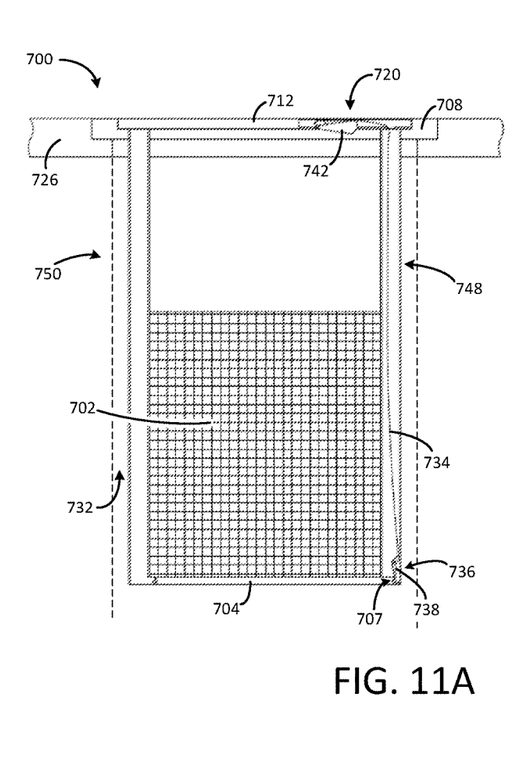
FIG. 11A illustrates a cross-sectional side view of an exemplary skimmer basket assembly in place in a skimmer basket well.
Figure 11B:
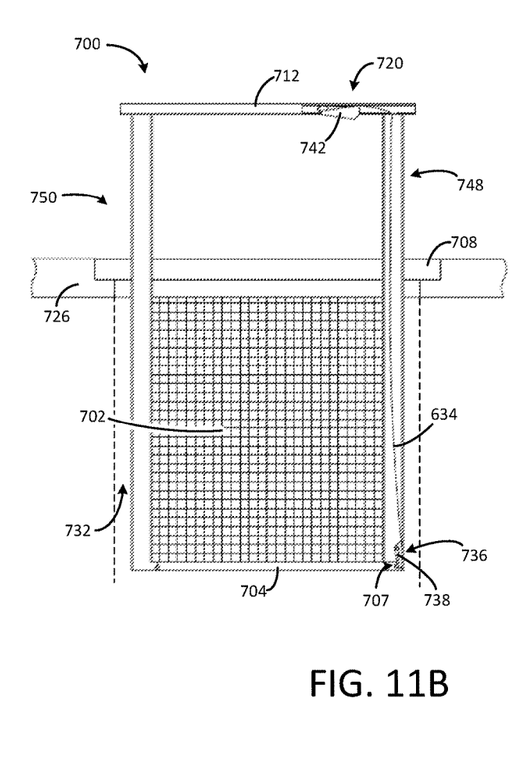
FIG. 11B illustrates a cross-sectional side view of an exemplary skimmer basket assembly partially removed from a skimmer basket well.

FIGS. 11A and 11B illustrate a skimmer basket assembly 700, similar in some aspects with the skimmer basket assembly 100 shown in FIG. 1 and/or the skimmer basket assembly 600 shown in FIGS. 6-9. The skimmer basket assembly 700 is positioned within a skimmer basket well 732 and includes a handle 712 connected to a basket 702 via a first connector 748 and a second connector 750. The basket 702 is configured to filter debris from water passing through the basket 702. The skimmer basket assembly 700 further includes a lid 712 configured to substantially cover the top opening of the basket 702 when so engaged. The lid 708 is configured with openings, which may allow the lid 708 to be slidingly displaced along at least a portion of the vertical, elongate lengths of the first connector 748 and/or the second connector 750. The bottom of the basket 702 is configured with a flap 704 that may be selectively opened or closed. In the closed position, seen in FIGS. 11A and 11B, the flap 704 is held in contact with the bottom of the basket 702. In the open position, the flap 704 is rotated downward, which allows debris in the basket 702 to fall from the basket 702.

The flap 704 is opened via a trigger assembly 720 disposed in association with the handle 712 (e.g., via a trigger 742 of the trigger assembly 720 extending from the handle 712). The trigger assembly 720 is operatively coupled, via a taut cable 734, to a latch assembly 736. The latch assembly 736 includes a latch arm 738 that engages an indentation 707 of the flap 704 when the flap 704 is in a closed position. To open the flap 704, the trigger assembly 720 may be actuated to exert a pulling force on the cable 734 and thereby actuate the latch assembly 736. The latch arm 738 is rotated away from the engagement with the indentation 707 of the flap 704, causing the flap 704 to fall into the open position.

FIG. 11A shows the skimmer basket assembly 700 positioned in the well 732, with the lid 708 sitting flush with the deck 726. The handle 712 rests on or partially within the lid 708. In FIG. 11B, the skimmer basket assembly 700 is in the initial stages of being pulled from the well 732. The handle 712 is pulled upwards, causing corresponding upward movement of the first connector 748, the second connector 750, and the basket 702. Yet because the first connector 748 and the second connector 750 both slide freely through the openings in the lid 708, the lid 712 remains substantially stationary and resting in substantial contact with the deck 726. Here, the top of the basket 702 is almost in contact with the lid 708. In later stages (not shown) of the process to remove the skimmer basket assembly 700 from the well 730, the lid 708 also may be lifted upwards by contact with the top of the basket 702. The lid 708 may thereby substantially cover the top opening of the basket 702. When the skimmer basket assembly 700 is clear of the well 732, the trigger assembly 720 may be actuated to cause the latch assembly 736 to release the flap 704.

While the disclosure has been described in connection with the various embodiments of the various figures, it is to be understood that other similar embodiments can be used or modifications and additions can be made to the described embodiments. Therefore, the skimmer basket assembly as described herein should not be limited to any single embodiment, but rather should be construed in breadth and scope in accordance with the appended claims.

What is claimed:

1. A skimmer basket assembly comprising:
   a basket having a bottom configured with one or more flaps;
   one or more connectors;
   a handle coupled to the basket via the one or more connectors, wherein the handle is mechanically coupled to the one or more flaps, wherein the handle is configured to selectively cause to open the one or more flaps, wherein the one or more connectors are configured to substantially expand, along an elongate axis of the respective connector, and increase a distance between the handle and a top rim of the basket; and
   a lid slidingly coupled to the one or more connectors, wherein the lid is configured to selectively and substantially cover a top opening of the basket.

2. The skimmer basket assembly of claim 1, wherein the one or more connectors are further configured to substantially contract, along the elongate axis of the respective connector, and decrease the distance between the handle and the top rim of the basket.

3. The skimmer basket assembly of claim 1, wherein the one or more connectors each comprise a first elongate component and a second elongate component slidingly coupled with the first elongate component, wherein the one or more connectors are configured to expand via, at least in part, the sliding coupling of the respective first elongate component and the respective second elongate component.

4. The skimmer basket assembly of claim 3, wherein the first elongate component comprises an inner surface defining, at least in part, a hollow interior space, wherein the one or more connectors are configured to expand via, at least in part, the second elongate component extending from the hollow interior space of the first elongate component.

5. The skimmer basket assembly of claim 3, wherein the first elongate component is coupled to the basket and the second elongate component is coupled to the handle.

6. The skimmer basket assembly of claim 3, wherein the first elongate component comprises a hollow cylinder and the second elongate component comprises a cylinder configured to selectively nest, at least in part, within the hollow cylinder of the first elongate component.

7. The skimmer basket assembly of claim 1, wherein the one or more connectors are configured to extend upon exertion of a pulling force on the handle in a direction opposite the basket.

8. The skimmer basket assembly of claim 1, wherein the handle comprises a trigger mechanism mechanically coupled, via a cable, to a release engaged with the one or more flaps, wherein, upon manipulation of the trigger mechanism, the release causes the one or more flaps to open.

9. The skimmer basket assembly of claim 8, wherein the cable is disposed, at least in part, within an interior of the one or more connectors.

10. The skimmer basket assembly of claim 9, wherein the cable is configured to be taut when the one or more connectors are about maximally expanded and slack when the one or more connectors are less than about maximally expanded.

11. A skimmer basket assembly comprising:
a basket having a bottom configured with one or more flaps;
one or more connectors, each configured to selectively and substantially expand and contract along an elongate axis of the respective connector;
a handle coupled to the basket via the one or more connectors;
a lid slidingly coupled to the one or more connectors, wherein the lid is configured to selectively and substantially cover a top opening of the basket; and
a trigger mechanism mechanically coupled to the one or more flaps, wherein the trigger mechanism is configured to cause to open the one or more flaps upon manipulation of the trigger mechanism.

12. The skimmer basket assembly of claim 11, wherein the one or more connectors each comprise a first elongate component and a second elongate component slidingly coupled with the first elongate component, wherein the one or more connectors are configured to expand via, at least in part, the sliding coupling of the respective first elongate component and the respective second elongate component.

13. The skimmer basket assembly of claim 12, wherein the first elongate component comprises an inner surface defining, at least in part, a hollow interior space, wherein the one or more connectors are configured to expand via, at least in part, the second elongate component extending from the hollow interior space of the first elongate component.

14. The skimmer basket assembly of claim 13, wherein the one or more connectors are configured to contract via, at least in part, the second elongate component retracting into the hollow interior space of the first elongate component.

15. The skimmer basket assembly of claim 12, wherein the first elongate component comprises a hollow cylinder and the second elongate component comprises a cylinder configured to selectively nest, at least in part, within the hollow cylinder of the first elongate component.

16. A skimmer basket assembly comprising:
a basket having a bottom configured with one or more flaps,
one or more lower elongate components coupled to the basket;
a handle mechanically coupled to the one or more flaps, wherein the handle is configured to selectively cause to open the one or more flaps;
one or more upper elongate components coupled to the handle, wherein the one or more upper elongate components are configured to slidingly couple, along an elongate axis of the respective upper elongate component, with a corresponding lower elongate component of the one or more lower elongate components; and
a lid slidingly coupled to the one or more upper elongate components, wherein the lid is configured to selectively and substantially cover a top opening of the basket.

17. The skimmer basket assembly of claim 16, wherein the one or more upper elongate components are configured to slidingly couple with the corresponding lower elongate component within an interior of the corresponding lower elongate component.

18. The skimmer basket assembly of claim 16, wherein the elongate axes of the one or more lower elongate components are substantially parallel to a side wall of the basket.

19. The skimmer basket assembly of claim 16, wherein the one or more lower elongate components are coupled to an interior surface of a side wall of the basket.

20. The skimmer basket assembly of claim 16, wherein the one or more lower elongate components are coupled to an exterior surface of a side wall of the basket.

* * * * *